US006965558B1

(12) United States Patent
Hann

(10) Patent No.: US 6,965,558 B1
(45) Date of Patent: Nov. 15, 2005

(54) METHOD AND SYSTEM FOR PROTECTING A NETWORK INTERFACE

(75) Inventor: William Patrick Hann, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 937 days.

(21) Appl. No.: 09/935,528

(22) Filed: Aug. 23, 2001

(51) Int. Cl.$^7$ ................................................ H04L 1/22
(52) U.S. Cl. .................. 370/216; 370/395.1; 370/503; 709/250; 709/208
(58) Field of Search ............................ 370/395.1, 503, 370/216, 356, 219, 220, 392, 465, 215; 714/10; 709/250, 208; 710/110; 712/31

(56) References Cited

U.S. PATENT DOCUMENTS

| | | | |
|---|---|---|---|
| 5,745,684 A * | 4/1998 | Oskouy et al. ............. 709/250 |
| 5,968,185 A * | 10/1999 | Bressoud et al. ............. 714/10 |
| 6,047,001 A * | 4/2000 | Kuo et al. ................... 370/428 |
| 6,073,249 A * | 6/2000 | Watabe et al. ................. 714/4 |
| 6,078,733 A * | 6/2000 | Osborne ..................... 709/250 |
| 6,173,411 B1 * | 1/2001 | Hirst et al. ..................... 714/4 |
| 6,370,155 B1 * | 4/2002 | Cantwell et al. ............ 370/465 |
| 6,473,397 B1 * | 10/2002 | Au .............................. 370/223 |
| 6,621,828 B1 * | 9/2003 | Field et al. .................. 370/466 |
| 6,680,904 B1 * | 1/2004 | Kaplan et al. ............... 370/217 |
| 6,834,038 B1 * | 12/2004 | Zelig et al. .................. 370/217 |
| 2001/0002199 A1 * | 5/2001 | Hershey et al. ............. 370/505 |
| 2003/0076839 A1 * | 4/2003 | Li et al. .................... 370/395.6 |

OTHER PUBLICATIONS

DL3000-CMX MODBUS Slave Interface, www.protocol-converter.com/products/dl3000cmxmsp.htttml.*
Profibus Newsletter, PROFIBUS DP Multi-Slave Interface Card, http://us.profibus.com/www/q.*

* cited by examiner

Primary Examiner—Kenneth Vanderpuye
Assistant Examiner—Binh Q Nguyen
(74) Attorney, Agent, or Firm—Baker Botts L.L.P.

(57) ABSTRACT

A method and system for protecting data transfers between a switch and physical network ports transfers data from a master network interface to a slave network interface, synchronizing the data transfer through a protection first in first out circuit that references the master clock and the slave clock. The master network interface improves ATM switch efficiency by supporting optical trunk and subtend ports for a digital subscriber line access multiplexer. The slave network interface provides back-up protection on a port basis so that a failed trunk port of the master network interface is backed up by the slave network interface even while the master network interface maintains a subtend port.

28 Claims, 2 Drawing Sheets

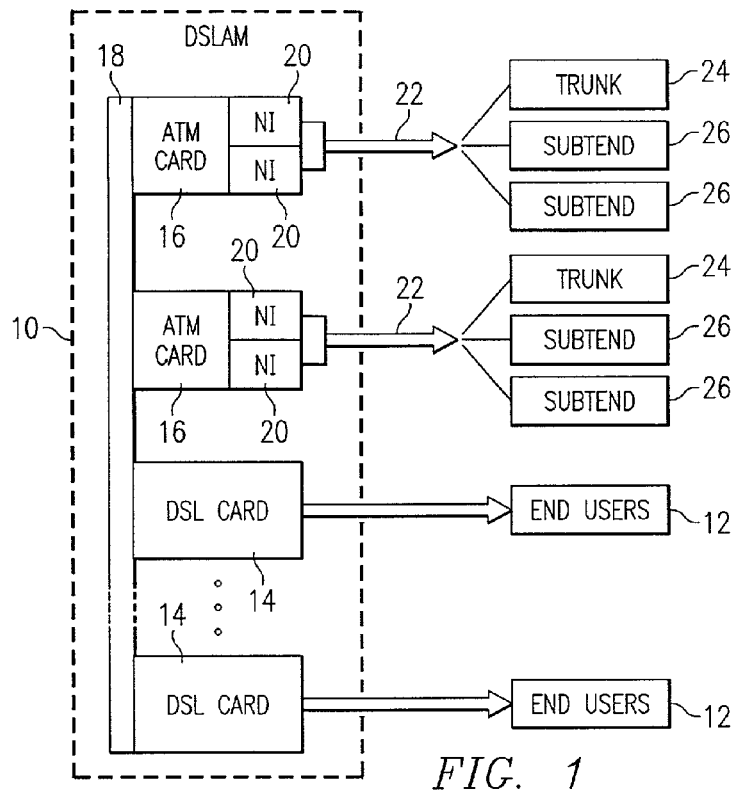
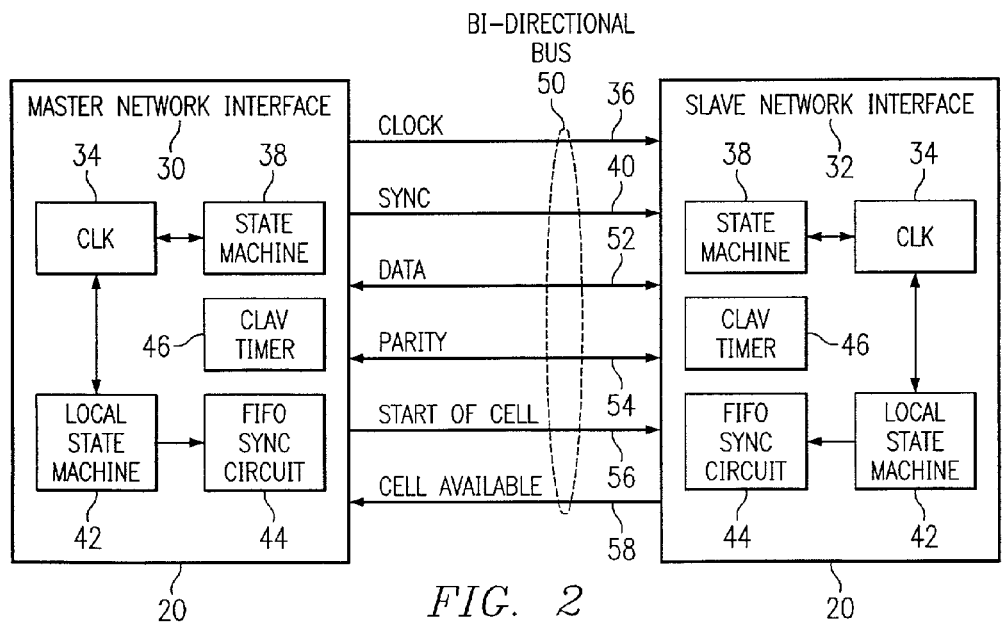
FIG. 1
FIG. 2

METHOD AND SYSTEM FOR PROTECTING A NETWORK INTERFACE

TECHNICAL FIELD OF THE INVENTION

This invention relates generally to network communications, and more specifically relates to a method and system for protecting a network interface.

BACKGROUND OF THE INVENTION

Digital subscriber line access multiplexers (DSLAM) typically interface a bank of modems with a broadband network. For instance, an asynchronous transfer mode (ATM) switch card in a DSLAM communicates with optical interfaces, such as trunks that interface with OC-3 fiber to a regional data center or subtends that interface with OC-3 fiber to other DSLAMs. If a network interface fails, then communication with the DSLAM is typically not possible. To improve reliability, redundant network interfaces are typically used.

One difficulty with protecting network communications through redundant network interfaces is the synchronization of data transfers when a failed network interface is protected by a backup network interface. Without synchronization, switching to a back-up network interface is more difficult. For instance, failure of a network interface leads to complete switching to another network interface so that each network interface typically only supports a single type of physical port.

SUMMARY OF THE INVENTION

Therefore a need has arisen for a method and system which synchronizes network interface data transfer for protection upon failure of a network interface with a backup network interface.

A further need has arisen for a method and system which protects from a network interface failure on a physical network trunk and subtend basis.

In accordance with teachings of the present invention, a method and system is provided that substantially eliminates disadvantages and problems associated with previously developed methods and systems for protecting network interfaces. Synchronization of a backup network interface to protect from failure of a master network interface is provided by slaving the backup network interface to the master and transferring data through a first in first out circuit.

More specifically, data transfers between a switch and a physical network are protected from failure with master and slave network interfaces. Data provided to the master network interface is communicated to the slave network interface through a first in first out circuit associated with the slave network interface. Data transfers with the master network interface are made through the protection first in first out circuit of the slave network interface based on a master clock synchronization. The protection first in first out circuit transfers data with the switch and physical network based on a slave clock synchronization. A timer detects failure of the master network interface.

In one embodiment, the master and slave network interfaces transfer data between an Asynchronous Transfer Mode (ATM) switch card inserted in a digital subscriber line access multiplexer (DSLAM) and optical networks for trunks and subtends. ATM cells are transferred from the master network interface to the protection first in first out circuit through a bi-directional bus. The timer detects failure of an interface by monitoring the time between cell available (CLAV) signals. Redundancy is provided on a physical network interface basis when plural physical networks communicate with the switch, such as trunk and subtend networks. For instance, if the master network interface fails to an optical trunk, then the slave network interface provides protection for the trunk while the master network interface maintains data transfers with an optical subtend.

The present invention provides a number of important technical advantages. One important technical advantage is that the master and slave network interface architecture allows multiple ports to feed an ATM switchcard, thus allowing greater bandwidth into the switchcard. If one port fails to a master network interface, the slave network interface provides data transfer to the network associated with the failed port while the master network interface continues to support operable ports.

Another important technical advantage of the present invention is that it allows optical interface redundancy on an ATM switch. The network interfaces share a substantially similar architecture so that either may function as master or slave, reducing complexity and improving flexibility.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1 depicts a block diagram of a DSLAM having trunk and subtend redundant network interfaces;

FIG. 2 depicts a block diagram of communications between a master and slave network interface.

DETAILED DESCRIPTION OF THE INVENTION

Figure 3:
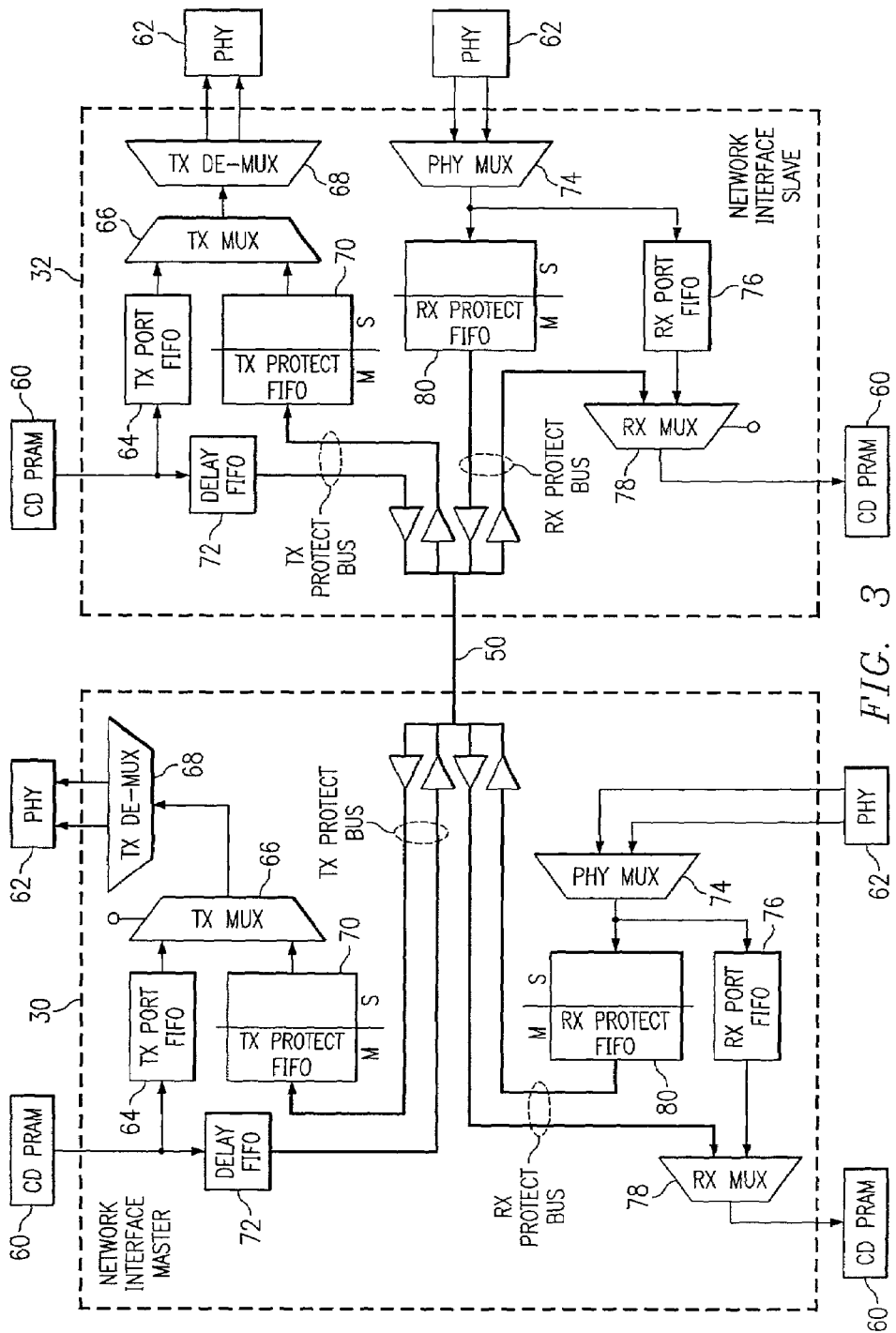
FIG. 3 depicts a block diagram of first in first out circuits for a master and slave network interface.

Preferred embodiments of the present invention are illustrated in the figures, like numerals being used to refer to like and corresponding parts of the various drawings.

ATM switch cards provide bandwidth capacity for modem banks, such as DSL modems deployed in a DSLAM, to communicate at high data rates with regional data centers over optical trunks, such as OC-3 trunks. Similarly, ATM switch cards allow subtend connections so that a series of DSLAMs may communicate with each other over optical interfaces, thus allowing the DSLAMs to use a common trunk. To ensure reliability, redundant network interfaces allow a back-up network interface to maintain data transfers of ATM cells between the ATM switch card and the optical trunks and subtends in the case of a failure of the main network interface.

Referring now to FIG. 1, a block diagram depicts a digital subscriber line access multiplexer (DSLAM) 10 that provides DSL service to end users 12 through DSL modem cards 14. The DSL modem cards 14 transfer data from end users 12 to ATM cards 16 through a bus 18. ATM cards 16 provide broadband communication through network interfaces 20 and optical communication pipelines 22 to either a trunk 24 or subtend 26. Trunk 24 provides access for DSLAM 10 to a regional data center, the internet or other public network. Subtend 26 allows the daisy chaining of a series of DSLAMS 10, such as to create a DSL modem bank. Although FIG. 1 depicts a single trunk and multiple subtends interfaced with the ATM card, in alternative embodiments, different configurations of trunks and subtends may be interfaced with the ATM card depending upon the available bandwidth, each trunk or subtend associated with both a master network interface 20 and a slave network interface 20 to transfer data with the ATM card.

Each network interface 20 supports an optical fiber interface, such as with a trunk 24 and two subtends 26. The network interface 20 provides redundancy for both trunk and subtend optical fiber interfaces, such as OC-3 interfaces. In case of failure of a network interface 20, a 16 bit, 50 MHz bi-directional bus allows a second network interface on an ATM card 16 to provide redundant communication for either or both of the OC-3 trunk port and an OC-3 subtend ports with full rates for the trunk and subtend interfaces. The number of trunks and subtends supported depend upon the bandwidth of the physical optical interface, e.g., OC-3, OC-12, etc. . . .

Referring now to FIG. 2, a block diagram depicts the interface between two network interfaces 20 that provide protection for ATM card 16. Although the network interfaces 20 are architecturally identical, one network interface is configured as a master network interface 30 and the backup network interface is configured as a slave network interface 32. Master network interface 30 provides a clock reference to slave network interface 32 and a synch pulse to synchronize slave network interface 32 with master network interface 30. Clock 34 provides a local clock reference for each network interface 20 and provides a clock reference through clock interface 36 from a master network interface 30 to a slave network interface 32.

Each network interface 20 has a 128-state state machine that runs by reference to the clock 34 of the master network interface 30. A synch interface 40 provides a synch pulse from master network interface 30 to slave network interface 32 to synchronize state machine 38 to the clock 34 of master network interface 30. For instance a synch pulse occurs at the beginning of a cell time, which is every 2.56 microseconds for a 128-state state machine on a 50 MHz clock. Synchronization of state machine 38 on slave network interface 32 by the clock 34 of master network interface 30 allows cells to be sent from slave network interface 32 to master network interface 30 at the appropriate time.

Each network interface 20 also has a 128-state local state machine 42 that runs on the clock 34 for that network interface 20. For instance, slave network interface 32 has a clock 34 that provides a clock reference to local state machine 42 that is not synched to the clock 34 of master network interface 30. A first in first out synch circuit 44 between the master network interface 30 and slave network interface 32 provides data synching by reference to the clock of master network interface 30. A cell available (CLAV) timer 46 tracks the operational status of each network interface 20 so that if an interface is declared inactive, protection is provided. For instance, cell available timer 46 determines that an optical interface is down when a cell available signal is not received for ten microseconds.

Master network interface 30 and slave network interface 32 communicate through a bi-directional bus 50, which includes a clock line 36, a synch line 40, a data path 52, a parity line 54, a start of cell line 56 and a cell available line 58. Bi-directional bus 50 is a 16 bit, 50 MHz bus that will support full data transfer rates for OC-3 trunk and subtend ports supported by a network interface 20. The data and parity signals are driven by the transmit interface of master network interface 30 and the slave received interface of slave network interface 32. Data transferred through data path 52 includes trunk and subtend cells sent in the following order: transfer master trunk, receive slave trunk, receive slave subtend, and transfer master subtend. The parity, master to slave start of cell, and slave to master cell available signals accompany the data transfers.

The slave to master cell available signal is also used for transfer back pressure status for master to slave and data flows in the direction of slave to master. When transmitting transfer cells to the optical interface of the trunk or subtend, a cell is not transmitted until both the master and slave transfer cell available are received. An optical interface is considered down if a cell available signal is not received for ten microseconds, resulting in a time out period. When a time out occurs, the cell available for the timed out interface is ignored when reading from that interface's cell dual port RAM (CDPRAM) but cells will continue to be passed to the optical interface if the cell available is active. A software monitor monitors the framer state and k-bytes of the receive optical interface to select the appropriate interface through a register of the network interfaces 20.

Referring now to FIG. 3, a block diagram depicts circuitry for synchronizing transmission and receive cells between a network interface master 30 and network interface slave 32 with first in first out circuits. Cells for transmission from and to the ATM card 16 are stored in CDPRAM 60, and cells transferred to and from fiber optic interface 22 are provided to physical interface 62, such as a utopia bus. Network interface slave 32 provides protection for both transmitted and received cells. The upper portion of FIG. 3 depicts the transmit path and the lower portion of FIG. 3 depicts the receive path. Each trunk and/or subtend interface support by the ATM card will have a transmit or receive path as depicted by FIG. 3, with the number of trunks and/or subtends limited by the bandwidth of the associated physical network 62.

Cells sent through the transmit path to the physical interface 62 originate in CDPRAM 60 and are sent to transmit port first in first out circuit 64. Cells are read from transmit port first in first out circuit 64 through a transmit multiplexer 66 and transmit de-multiplexer 68 when the trunk or subtend physical interface 62 can accept the cell.

To provide transmit protection, master network interface 30 transfers CDPRAM cells across bi-directional bus 50 to a transmit protect first in first out circuit 70. To avoid collisions on bi-directional bus 50, cells from CDPRAM 60 are delayed in delay first in first out circuit 72 before transfer to transmit protect first in first out circuit 70. The slave network interface 32 writes the cells into the transmit protect first in first out circuit for transfer to the slave network interface 32's physical interface 62 through transmit multiplexer 66 and transmit de-multiplexer 68. Timers associated with the physical devices for trunks and subtends provide cell available signals to read the cells so that if no cell available signal is received from a device for ten microseconds, a timeout occurs and the interface becomes inactive. Transmit protect first in first out circuit 70 writes cells with reference to the clock of the master network interface 30 and reads cells with reference to the clock of the slave network interface 32. Since the master network interface 30 and slave network interface 32 have identical transmit path architectures, either network interface may be selected as master or slave.

The receive path of the master interface provides protection through the slave interface in a manner similar to the transmit path, using first in first out circuits to synchronize received data cells. Cells are received from the physical interface 62 through a physical multiplexer 74 and a receive port first in first out circuit 76. The cells are read from the receive port first in first out circuit 76 and written to CDPRAM 60 through receive multiplexer 78 for storage in cell buffer random access memory of ATM card 16. To provide protection, cells read into the master network interface 30 are stored in a receive protect first in first out circuit 80 of slave network interface 32 and read out based on a synch signal received from master network interface 30. The synch pulse from master network interface 30 synchronizes the local state machine 42 of the slave network interface 32 to the clock reference of the master network interface 30. Thus, the synch pulse allows the slave network interface 32 to know when the master network interface 30 can accept cells and reads the cells from the receive protect first in first out circuit 80 at the appropriate time.

Protection software associated with master network interface 30 selects trunk or subtend cells from the slave network interface 32 or the master network interface 30's receive port first in first out circuit 76 based on the OC-3 framer states and k-bytes. Receive protect first in first out circuit 80 synchronizes cells sent from slave network interface 32 by using the slave reference clock to write the cells and the master reference clock to read cells. If a network interface goes down, the operative interface is selected by the protection software. For example, if the master network interface 30 subtend interface times out, the master network interface 30 will switch to accepting cells from the slave subtend physical interface 62 while still accepting cells from the master trunk physical interface 62.

The master network interface 30 and slave network interface 32 have substantially similar architectures so that either may function as master or slave. Each physical network port has a receive and transmit protect first in first out circuit associated with it. By having the ability to interface both subtends and trunks with redundancy through separate protect first in first out circuits, the present invention helps use available bandwidth through the ATM cards in a more efficient manner.

Although the present invention has been described in detail, it should be understood that various changes, substitutions and alterations can be made hereto without departing from the spirit and scope of the invention as

What is claimed is:

1. A method for protecting data transfers between a switch and a physical network, the method comprising:
providing data to a first network interface for transfer between the switch and the physical network, the first network interface having a first reference clock;
transferring the data from the first network interface to a second network interface, the second network interface operable to transfer data between the switch and the physical network, the second network interface having a second clock reference; and
synchronizing the transfer of data from the second network interface with a first in first out circuit that writes transfers of data from the first network interface using the first reference clock and reads data using the second clock reference.

2. The method of claim 1 wherein the data is provided to the first network interface from the switch for transfer to the physical network.

3. The method of claim 1 wherein the data is provided to the first network interface from the physical network for transfer to the switch.

4. The method of claim 1 further comprising:
detecting a failure of the first network interface; and
using the second network interface to transfer the data between the switch and the physical network.

5. The method of claim 1 wherein the data comprises ATM cells.

6. The method of claim 5 wherein the switch comprises an ATM card for transferring data from a digital subscriber line access multiplexer to a trunk.

7. The method of claim 5 wherein the switch comprises an ATM card for transferring data from a digital subscriber line access multiplexer to a subtend.

8. The method of claim 1 wherein the physical network comprises an optical interface.

9. The method of claim 8 wherein the optical interface comprises an OC-3 interface.

10. The method of claim 1 wherein the physical network interface comprises a trunk interface and a subtend interface.

11. The method of claim 10 further comprising:
detecting a failure of data transfer between the trunk and the switch; and
using the second network interface to transfer data between the trunk and the switch.

12. The method of claim 11 further comprising:
using the first network interface to transfer data between the subtend and the switch.

13. The method of claim 1 further comprising:
detecting failure of the first network interface by monitoring cell available signals.

14. A system for protecting data transfers between a switch and a physical network, the system comprising:
a master network interface having a reference clock;
a slave network interface having a reference clock, the slave network interface in communication with the master network interface;
a timer to detect failure of the master network interface for initiating protection with the slave network interface; and
a protection first in first out circuit associated with the slave network interface, the first in first out circuit reading data transferred from the master network interface synchronized to the master reference clock and writing data synchronized to the slave reference clock.

15. The system of claim 14 wherein the switch comprises an ATM switch.

16. The system of claim 15 wherein the timer detects failure by timing cell available signals.

17. The system of claim 14 wherein the physical network comprises a trunk.

18. The system of claim 14 wherein the physical network comprises a subtend.

19. The system of claim 14 wherein the physical network comprises at least one trunk and one subtend, the system further comprising:
plural protection first in first out circuits associated with the slave network interface, each protection first in first out circuit associated with one of the trunk or subtend.

20. The system of claim 19 wherein upon detection of a failure of data transfer between the trunk and switch with the master network interface, the slave network interface maintains data transfers between the trunk and the switch and the master network interface maintains data transfers between the subtend and the switch.

21. The system of claim 19 wherein upon detection of a failure of data transfer between the subtend and the switch with the master network interface, the slave network interface maintains data transfers between the subtend and the switch and the master network interface maintains data transfers between the trunk and the switch.

22. The system of claim 19 wherein the switch comprises an ATM card installed in a digital subscriber line access multiplexer.

23. The system of claim 14 wherein the physical network comprises plural optical interfaces.

24. The system of claim 14 wherein the master and slave network interfaces have substantially similar architectures so that either the slave or the master network interface may perform the function of the master network interface.

25. A digital subscriber line access multiplexer comprising:
  plural card slots;
  an ATM switch card installed in one of the card slots; and
  first and second network interfaces in communication with each other, each network interface having a clock reference and operable to interface the ATM switch card with plural physical networks, wherein the first network interface functions as a master and the second network interface functions as a slave to provide protection upon failure of the master, the second network interface having first in first out circuits that synchronize data transfers with the master network interface using the master clock reference and the slave clock reference.

26. The digital subscriber line access multiplexer of claim 25 wherein one of the plural physical networks comprises a trunk and another of the plural physical networks comprises a subtend.

27. The digital subscriber line access multiplexer of claim 25 wherein the physical networks comprise optical networks.

28. The digital subscriber line access multiplexer of claim 25 further comprising a cell available timer associated with each network interface, the cell available timer for detecting network interface failure.

* * * * *